United States Patent
Brandt

[19]

[11] Patent Number: 6,029,633
[45] Date of Patent: Feb. 29, 2000

[54] PASSIVE FUEL DELIVERY MODULE AND SUSPENSION MECHANISM

[75] Inventor: Timothy B. Brandt, West Des Moines, Iowa

[73] Assignee: Parr Manufacturing, Inc., Des Moines, Iowa

[21] Appl. No.: 09/108,793

[22] Filed: Jul. 2, 1998

[51] Int. Cl.[7] ............................................... F02M 37/04
[52] U.S. Cl. ........................................ 123/509; 123/510
[58] Field of Search ................................ 123/509–510, 123/495, 497

[56] References Cited

U.S. PATENT DOCUMENTS

| | | | |
|---|---|---|---|
| 5,392,750 | 2/1995 | Laue et al. ........................... | 123/509 |
| 5,564,396 | 10/1996 | Kleppner et al. ..................... | 123/509 |
| 5,647,330 | 7/1997 | Sawert et al. ........................ | 123/509 |
| 5,649,514 | 7/1997 | Okada et al. ......................... | 123/514 |
| 5,699,773 | 12/1997 | Kleppner et al. ..................... | 123/510 |
| 5,758,627 | 6/1998 | Minagawa et al. ................... | 123/509 |
| 5,769,061 | 6/1998 | Nagata et al. ........................ | 123/509 |
| 5,782,223 | 7/1998 | Yamashita et al. ................... | 123/510 |
| 5,908,020 | 6/1999 | Boutwell et al. ..................... | 123/509 |

*Primary Examiner*—Thomas N. Moulis
*Attorney, Agent, or Firm*—Henderson & Sturm

[57] ABSTRACT

A passive fuel delivery module adapted for installation in fuel tanks of vehicles. The passive fuel delivery module maintains a minimum fuel reserve in a fuel reserve reservoir for the fuel pump and includes primary and secondary fuel filters for filtering both the tank fuel and reservoir fuel. The passive fuel delivery module further includes a suspension mechanism which enables the fuel delivery module to vertically displace with the bottom surface of the fuel tank.

11 Claims, 9 Drawing Sheets

Primary Inlet  Secondary Inlet

PASSIVE FUEL DELIVERY MODULE AND SUSPENSION MECHANISM

CROSS-REFERENCE TO RELATED APPLICATIONS

Not Applicable

STATEMENT REGARDING FEDERALLY SPONSORED RESEARCH OR DEVELOPMENT

Not Applicable

AUTHORIZATION PURSUANT TO 37 C.F.R. §§ 1.71(d), (e)

Not Applicable

BACKGROUND OF THE INVENTION

1. Field of the Invention

This invention relates generally to fuel delivery systems for vehicles, and more particularly to fuel delivery modules housed within a vehicle's fuel tank.

2. Description of the Related Art

Over the past several years, fuel pumps for passenger automobiles and light trucks have changed from a mechanical engine-mounted device to an electrically-operated gear pump or turbine pump mounted in the fuel tank of the vehicle. Conventional gear or turbine fuel pumps are typically located at the bottom center of the tank, as opposed to off to one side of the tank. This bottom center location ensures that the maximum amount of fuel is available to the pump even when the fuel level is low and minimizes fuel starvation of the fuel pump as the fuel sloshes from one side of the tank to the other during vehicle cornering, braking, or accelerating, or when driving or parking on a slope.

Fuel starvation occurs when the inlet of the fuel pump is not immersed in fuel, and the fuel pump sucks air or vapor rather than fuel. Fuel pump starvation results in engine stammer or stalling or engine start-up difficulty and is of particular concern in later model vehicles having fuel injected engines, due to the precise metering and timing requirements of injecting fuel into the fuel/air intake ports of the engine cylinders.

In an attempt to overcome the problem of fuel pump starvation during vehicle operation, baffles were often welded or formed into the fuel tanks to restrain a portion of the fuel from "sloshing" away from the fuel pump during vehicle maneuvering, thus keeping the fuel pump inlet immersed in fuel at all times. Such attempts met with limited success. Today, most fuel tanks are manufactured from puncture-resistant, rubberized plastic and no longer utilize baffles due to the limited success of their intended purpose, the difficulty in manufacturing, and added cost. Instead, most conventional vehicles now utilize electrically operated passive fuel delivery modules that have a fuel reservoir from which fuel can be drawn from during times when vehicle maneuvering forces the tank fuel away from the fuel pump inlet.

Passive fuel delivery modules are comprised of a gear or turbine fuel pump, a housing which surrounds the fuel pump and acts as a fuel reservoir from which the pump can draw during times when the fuel is forced away from the fuel pump during vehicle operation, and a pressure regulator and valve assembly which is in fluid communication with the fuel injectors. Conventional passive fuel delivery modules require a check valve or float valve to prevent the reservoir fuel from escaping the reservoir. These check valves or float valves not only add to the cost of the fuel delivery module, but the valves can fail, resulting in additional maintenance or replacement expense. Further, current fuel delivery modules only filter the fuel coming from the main fuel tank, not the reservoir fuel. By only filtering one stage of the fuel delivery module, the pump may be exposed to debris or contaminants in the reservoir fuel which could damage the pump. Therefore, it should be appreciated that an improved passive fuel delivery module is required in the industry that eliminates the need for check valves or float valves to maintain fuel in the reservoir, and an improved passive fuel delivery module that filters both the reservoir fuel and the tank fuel before the fuel enters the fuel pump.

In addition to the above mentioned drawbacks of conventional passive fuel delivery modules, another problem deals with their suspension within the fuel tank. As discussed above, most fuel pumps and/or the later devised passive fuel delivery modules are located at the bottom center of the fuel tank. With steel fuel tanks, the mounting or suspension of the pumps and/or fuel delivery modules was not of particular concern. However, as mentioned above, most fuel tanks are now manufactured from puncture-resistant rubberized plastic. These plastic fuel tanks are less rigid than the previous steel tanks and therefore tend to deflect more when loaded with fuel. As such, the fuel pumps and/or fuel delivery modules must be mounted or suspended in such a way as to allow them to vertically displace with the bottom of the fuel tank. One type of such a suspension system utilizes vertically disposed slide rails suspended from the top of the fuel tank. The fuel pump and/or fuel delivery module slides up and down on these rails as the bottom of the tank vertically deflects. A passive fuel delivery module mounted in such a way is difficult and time consuming to service. Therefore, an improved suspension system is needed in the industry that enables the passive fuel delivery module to be easily removed and installed for routine maintenance and servicing.

Additionally, current designs of the passive fuel modules and the pressure regulator assemblies attached thereto are difficult to access for repair and maintenance. Therefore, it is desirable to have a passive fuel module and fuel pressure regulator combined in a single unit which is can be easily removed and installed in the fuel tank for routine maintenance and servicing.

Therefore, those familiar with fuel delivery modules recognize the need for an improved passive fuel delivery module which eliminates the need for check valves or float valves, which has an improved suspension mechanism, and which can be easily removed from the tank for repair and maintenance.

BRIEF SUMMARY OF THE INVENTION

The present invention is a passive fuel delivery module and suspension mechanism adapted for installation in fuel tanks of vehicles. The passive fuel delivery module is comprised of a top cover adapted to be secured to the top of a fuel tank of a vehicle, a reservoir housing operably supported by and disposed below the top cover for receiving and holding a fuel reserve, and an elongated sleeve having one end extending a distance into the reservoir housing and another end extending a distance below the reservoir housing. The passive fuel delivery module is further comprised of a turbine pump disposed within the sleeve. Primary and secondary annular filters concentrically surround the sleeve. A casing is disposed between the concentrically disposed primary and secondary filters. An end cap is removably attaches to the bottom of the casing thus substantially fluidly sealing the secondary filter from the primary filter.

The pump is a turbine pump having inner and outer series of impeller blades separated by an annular ring. The pump further includes high pressure inlet and outlet ports and low pressure inlet and outlet ports. The inner impeller blades are disposed over the low pressure pump inlet, the outer impeller blades are disposed over said high pressure pump inlet. The annular ring substantially fluidly seals the low pressure inlet port from the high pressure inlet port. Whereby rotation of the impeller blades of the turbine pump creates a low pressure which draws fuel through the primary filter and into low pressure pump inlet. The fuel is discharged out through the low pressure pump outlet and then up into the reservoir housing. The fuel is then drawn down through the secondary filter and into the high pressure pump inlet, then out through the high pressure pump outlet which is in fluid communication with a fuel pressure regulator assembly which is in fluid communication with the vehicles fuel injectors.

The passive fuel delivery module is further comprised of a suspension mechanism that enables the module to displace vertically with the bottom of the fuel tank. The hose connecting the high pressure pump outlet of the fuel delivery module with the fuel pressure regulator assembly is configured to bias the passive fuel delivery module downward such that the primary filter end cap of the module is in contact with the bottom surface of the fuel tank. The suspension mechanism is further comprised of a pair of U-shaped linkages, one leg of each U-shaped linkage is operably and pivotally connected to the top cover, the other leg of each U-shaped linkage is operably and pivotally connected to the reservoir housing, resulting in a dual pivot connection that enables the module to displace vertically along with the bottom surface of the fuel tank.

An object of the present invention is to provide an improved passive fuel delivery module.

Another object of the present invention is to provide a passive fuel delivery module that does not require check valves or float valves to retain fuel in the fuel reserve.

A further object of the present invention is to provide a fuel delivery module that filters the fuel coming from the main fuel tank and the fuel reserve, thus filtering both stages of the fuel delivery module to ensure adequate protection of the fuel pump.

A still further object of the present invention is to provide an improved suspension system which enables vertical displacement of the passive fuel module.

A still further object of the present invention is to provide an improved means of mounting the module and pressure regulator in the fuel tank for easier access for repair and maintenance.

Other objects, advantages, and novel features of the present invention will become apparent from the following detailed description of the invention when considered in conjunction with the accompanying drawings.

DETAILED DESCRIPTION OF THE INVENTION

Figure 1:
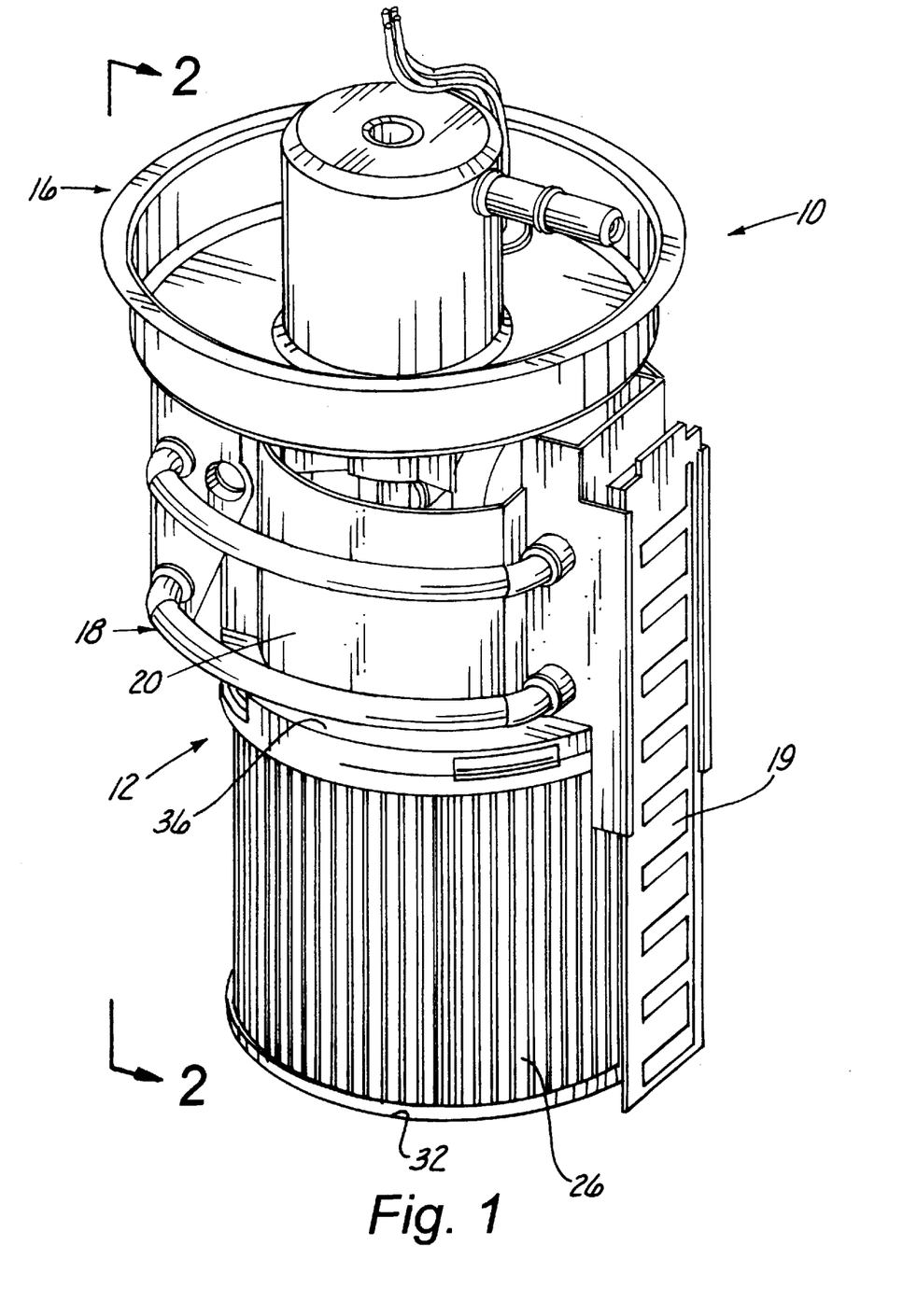
FIG. 1 is a perspective view of the passive fuel delivery module and suspension mechanism of the present invention.

Referring now to the drawings, wherein like reference numerals designate identical or corresponding parts throughout the several views, FIG. 1 shows the present invention depicted generally at (10). The present invention (10) is comprised of a passive fuel delivery module (12), a pressure regulator assembly (14) (see also FIG. 4), a top cover assembly (16) and a suspension assembly (18). A solid state electronic fuel level sensor (19) is shown mountably secured to the fuel delivery module (12).

Figure 2:
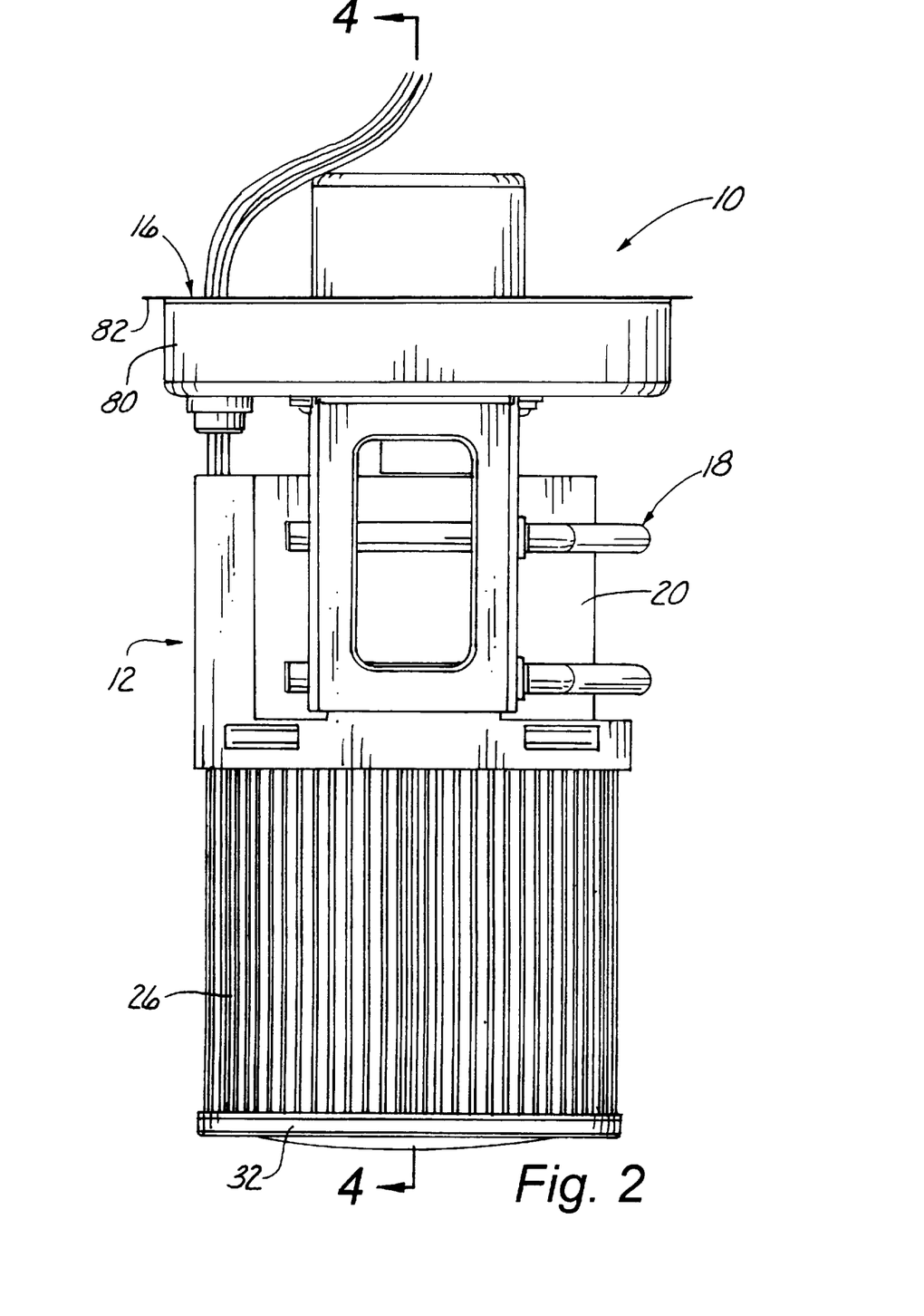
FIG. 2 is a side elevation view of the passive fuel delivery module and suspension mechanism of the present invention as viewed along lines 2—2 of FIG. 1.
Figure 4:
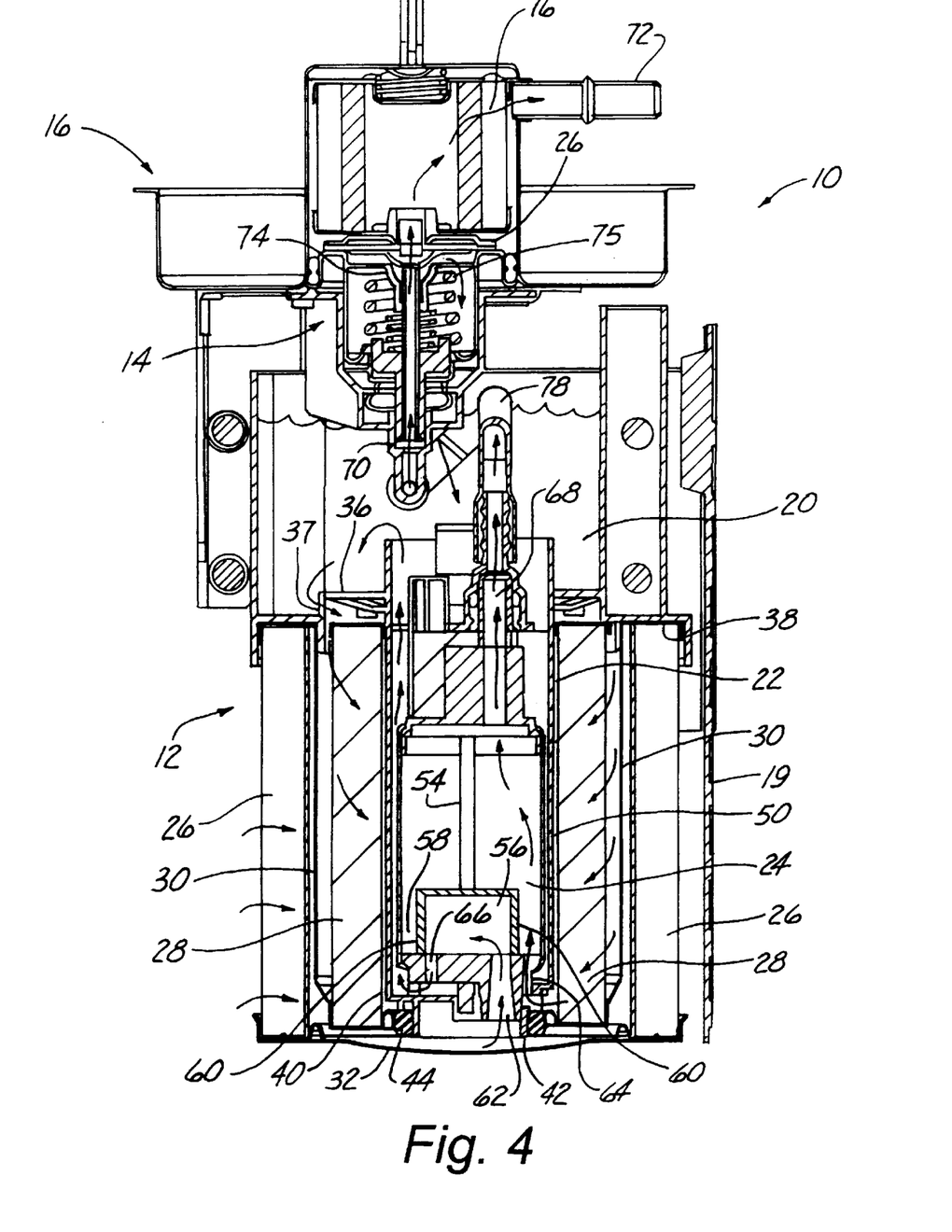
FIG. 4 is a cross-sectional view of the passive fuel delivery module and suspension mechanism of the present invention taken along lines 4—4 of FIG. 2.

Referring now primarily to FIG. 4, in conjunction with FIGS. 1 and 2, the passive fuel delivery module (12) is comprised of a reservoir housing (20), an elongated sleeve (22), a turbine pump (24), a primary filter (26), a secondary filter (28), a casing (30), and a primary filter end cap (32).

The reservoir housing (20) is comprised of side walls (34) and an annular shaped bottom plate (36). The annular bottom plate (36) includes a plurality of passages (37) to enable passage of fuel therethrough (the purpose of which will be discussed later). The bottom plate (36) has a flanged lower surface adapted to receive the primary and secondary filters (26 and 28) as shown in FIG. 4 and as discussed below. Additionally the annular bottom plate (36) receives one end of the elongated sleeve (22).

The primary and secondary filters (26 and 28) are typical cylindrical fuel filters having a suitable filter media to filter contaminates from the fuel. The filters (26 and 28) are concentrically disposed around the elongated sleeve (22) below the reservoir's annular bottom plate (36). A cup-shaped casing (30) is located between the concentrically disposed filters (26 and 28) and acts to seal the secondary filter (28) from the primary filter (26) as well as support the two filters (26 and 28) below the reservoir housing (20). The cup-shaped casing (30) includes an upper flange (38) and a lower flange (40). The lower flange (40) is adapted to receive the lower end of the secondary filter (28). The upper flange (38) is adapted to receive the upper end of the primary filter (26) and is sized to snugly fit within the flanged lower surface of the annular bottom plate (36). Thus, as shown in FIG. 4, the secondary filter (28) is contained within the casing (30) and both filters (26 and 28) are securely suspended below the bottom of the reservoir housing (20). The bottom of the cup shaped casing (30) includes a passage (42) sized to receive the lower end of the elongated sleeve (22). An O-ring seal (44) acts to seal the sleeve (22) within the passage (42) of the cup-shaped casing (30). The end cap (32) fits over the bottom end of the primary filter (26) and snaps onto the bottom of the casing (30) thus sealing off all passages for the fuel to enter the module (10) except through the filter medium of the primary and secondary filters (26 and 28).

Figure 5:
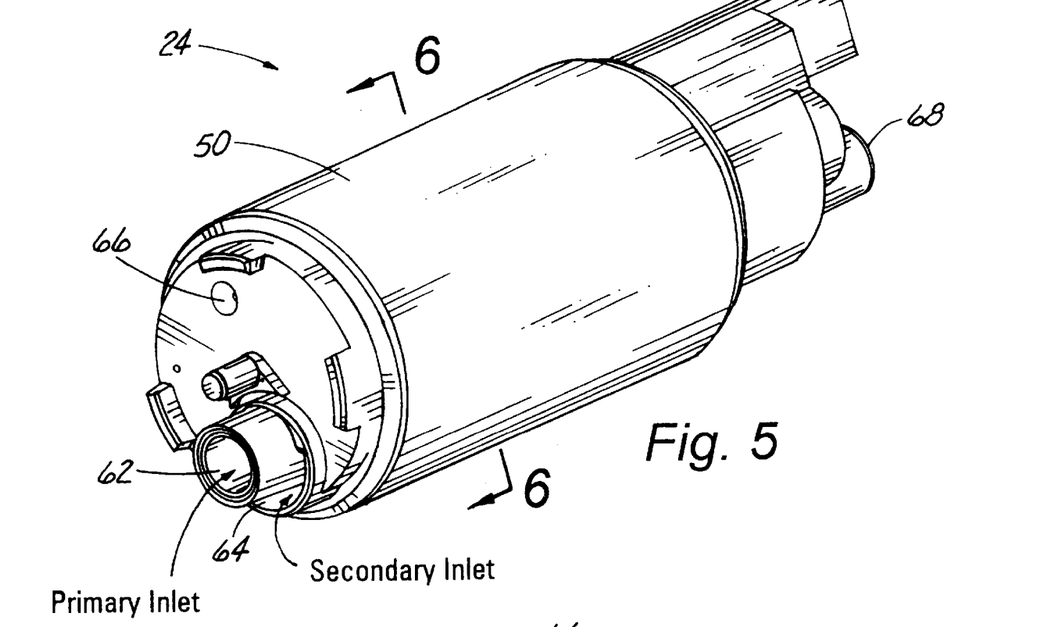
FIG. 5 is a perspective view of a typical turbine pump used in the passive fuel delivery module of the present invention.
Figure 6:
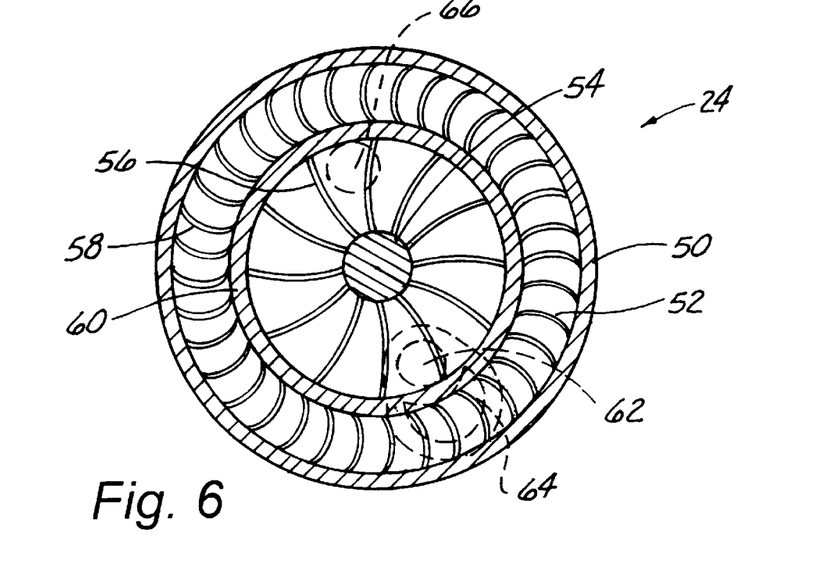
FIG. 6 is a cross-sectional view of the turbine pump take along lines 6—6 of FIG. 5.

Continuing to refer primarily to FIG. 4 in conjunction with FIGS. 5 and 6, the pump (24) is a typical electrically powered turbine pump. The pump (24) is comprised of an outer shell (50) which houses a turbine (52) and shaft (54). The turbine (52) is comprised of a series of inner impellers (56) and outer impellers (58) separated by an annular ring (60) (see FIG. 6). The pump (24) includes a low pressure inlet (62), a high pressure inlet (64) a low pressure outlet (66) and a high pressure outlet (68) (FIGS. 4, 5 and 6). As best viewed in FIGS. 4 and 6, the annular ring (60) separates the low pressure inlet (62) from the high pressure inlet (64). The purpose of this separation will be discussed in detail later.

The pressure regulator assembly (14) is of the type disclosed in U.S. Pat. No. 5,078,167 or U.S. Pat. No. 5,584,318, both of which are incorporated herein by reference. The pressure regulator assembly (14) includes a fuel inlet tube (70), a fuel outlet tube (72), a spring biased valve (74) and a final fuel filter (76). The fuel inlet tube (70) is connected to the high pressure pump outlet (68) by a hose (78) thus allowing fuel communication from the pump (24) to the regulator assembly (14). The hose (78) is configured to bias the passive fuel delivery module (12) downward (the purpose for which will be discussed later). The final fuel filter (76) is disposed between the fuel inlet tube (70) and the fuel outlet tube (72) for filtering impurities from the fuel passing therethrough. The spring biased valve (74) is in fluid communication with the fuel inlet tube (70), such that all of the fuel in the fuel inlet tube (70) will normally pass through the filter (76). However, when the pressure in the fuel supply outlet (72) exceeds the bias resistance of the spring, the valve (74) will open to enable the fuel flow to be short circuited back into the fuel reservoir housing (20).

Figure 3:
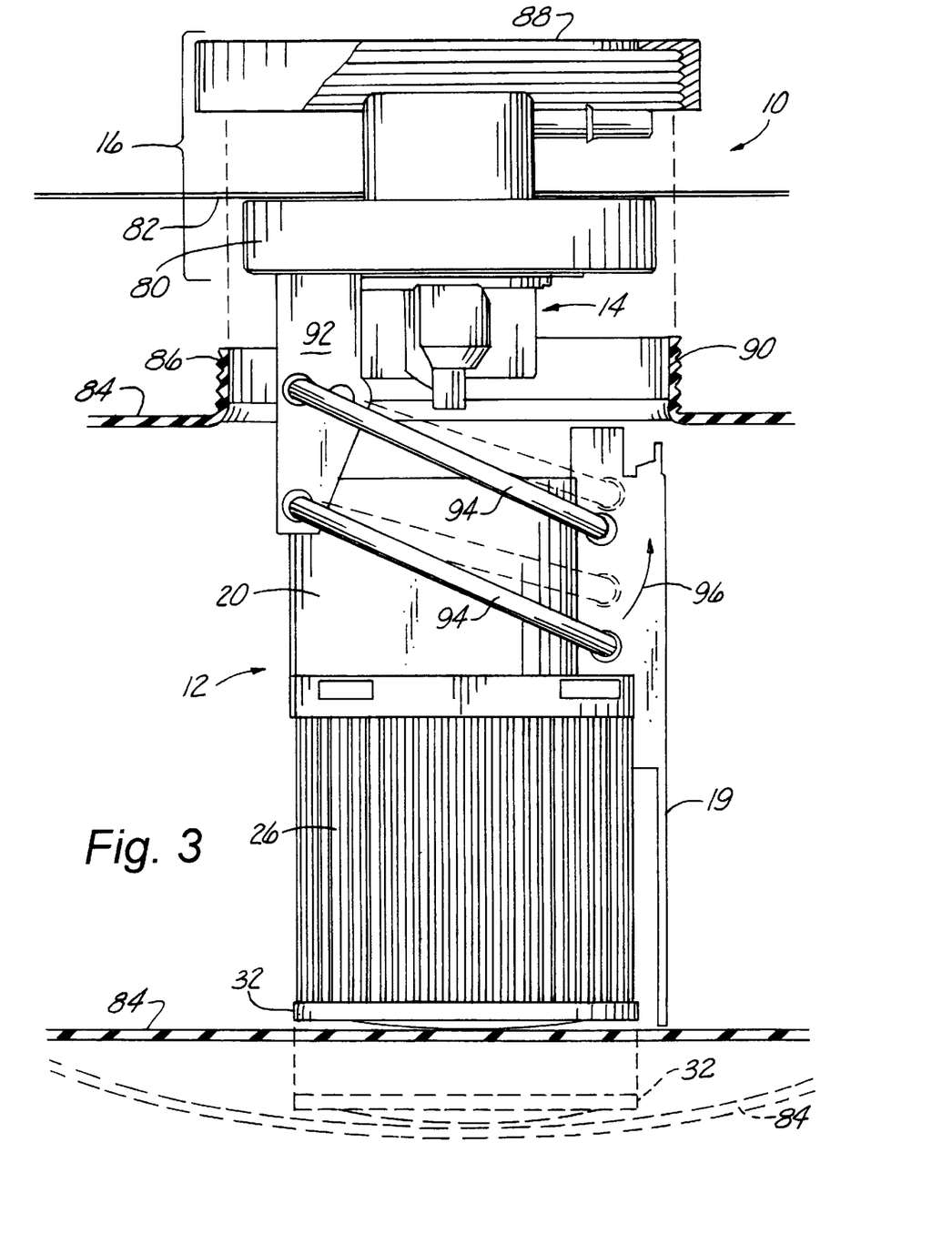
FIG. 3 is a partially exploded side elevation view of the passive fuel delivery module and suspension mechanism of the present invention being installed in the fuel tank of a vehicle.

Referring now to FIGS. 1–4, and in particular FIG. 3, the top cover assembly (16) is comprised of an annular flanged top cover (80) which houses a portion of the pressure regulator assembly (14). The annular flange (82) of the top cover (80) is sized to rest on top of the threaded opening (86) of the fuel tank (84). An annular lid (88) threadably secures the top cover (80) to the fuel tank opening (86) much like a mason jar. The opening (86) of the fuel tank (84) may be provided with an annular ring seal (90) to better seal the top cover (80) to the tank opening (86).

Referring again to FIGS. 1–4, the suspension assembly (18) is comprised of a pair of U-shaped linkages (94) and a hanger bracket (92) fixed to the top cover (80). One leg of each U-shaped linkage (94) is pivotally connected to the hanger bracket (92). The other leg of each U-shaped linkage (94) is pivotally connected to the reservoir housing (20) of the passive fuel delivery module (12). FIG. 3 shows the fuel delivery module (12) being installed within a fuel tank (84). The primary filter end cap (32) is shown in contact with the bottom of the fuel tank (84). It should be appreciated that as the top cover (80) is forced downwardly such that the annular flange (82) comes in contact with the fuel tank opening (86) and is secured in place by the annular lid (88), the U-shaped linkages (94) will pivot upwardly as indicated by the arrow (96) and dashed lines. The hose (78) connecting the pressure regulator assembly (14) to the high pressure fuel pump outlet (68) is configured to bias the module (12) downwardly, such that the end cap (32) remains in constant contact with bottom of the fuel tank (84). It should therefore be appreciated that the downward bias on the module (12), along with the pivoting parallel U-shaped linkages (94) enables the passive fuel delivery module (12) to displace vertically with the bottom of the fuel tank (84) when the tank deflects due to the fuel load as indicated in dashed lines.

Figure 7:
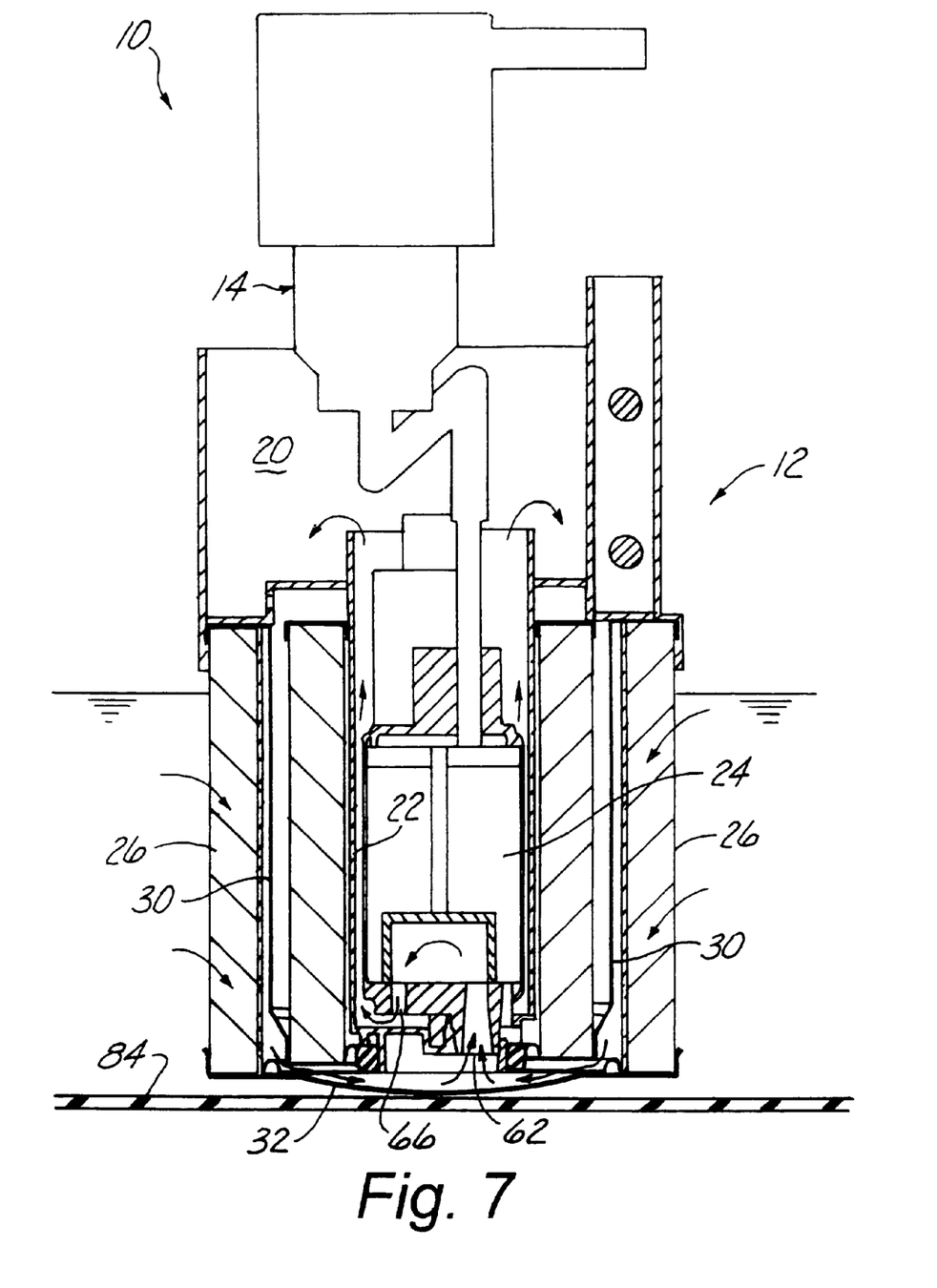
FIGS. 7–10 are schematic illustrations of the fuel flow through the passive fuel delivery module of the present invention.

FIGS. 7–10, are schematic illustrations of the fuel flow through the passive fuel delivery module (12) and pressure regulator assembly (14). Referring first to FIG. 7, during vehicle operation, the spinning of the turbine (52) of the pump (24) creates a low pressure within the module (12) such that the fuel is drawn through the primary filter (26) of the fuel delivery module (12) as indicated by the arrows. The casing (30) directs the fuel downward where it passes between the end cap (32) and the casing (30). The fuel is then drawn through the low pressure pump inlet port (62) and forced out of the low pressure pump outlet port (66). The fuel is thereby forced upwardly between the elongated sleeve (22) and the pump (24) where it discharges into the reservoir housing (20). It should be noted that an additional benefit of the movement of fuel past the pump (24) is that the movement of fuel acts to cool the pump (24) thus protecting it from overheating, thereby extending pump life.

Figure 8:
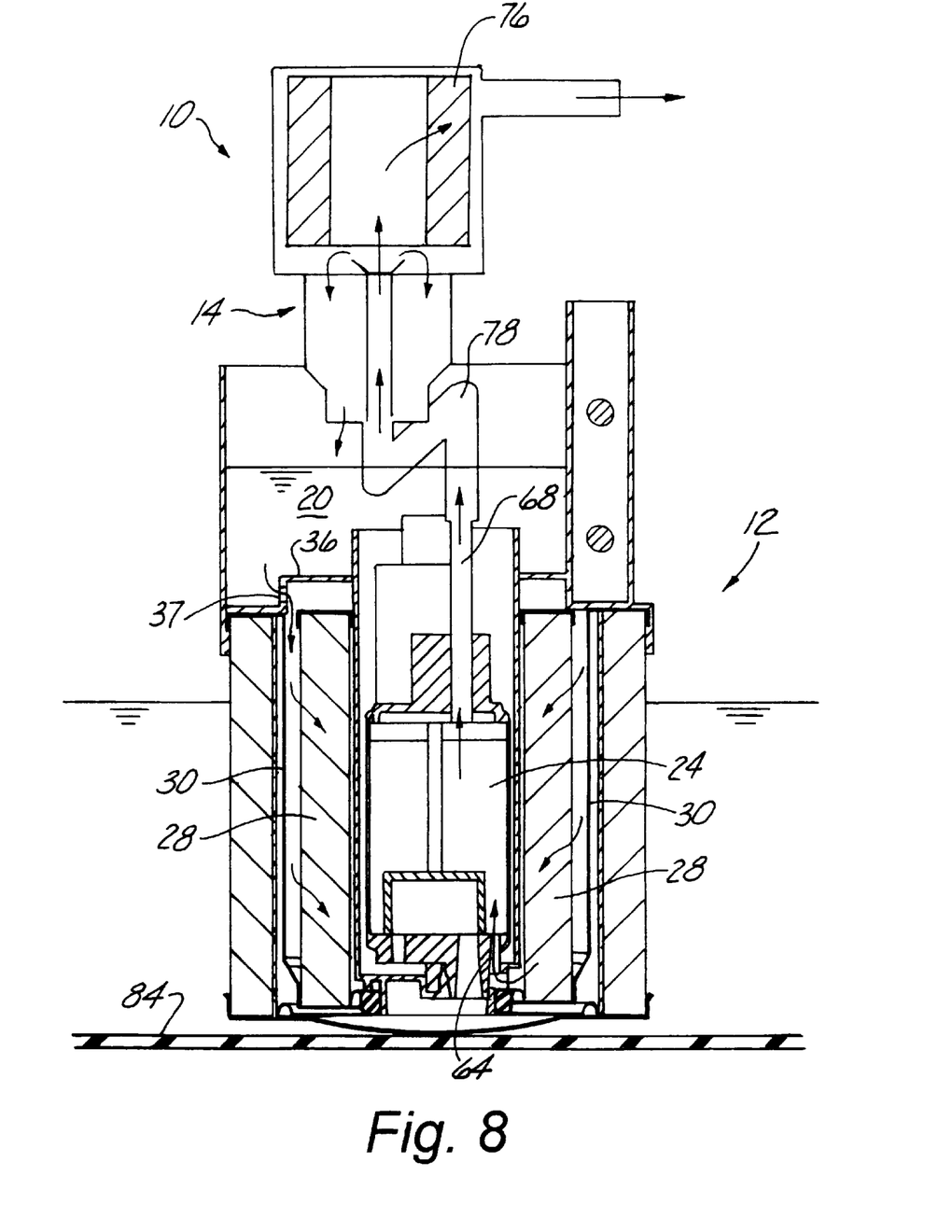

Referring now to FIG. 8, the fuel in the reservoir housing (20) passes through passages (37) in the annular bottom plate (36) filling the area between the inside of the casing (30) and the secondary filter (28). The low pressure created by the spinning of the turbine (52) of the fuel pump (24) draws the fuel through the secondary filter (28) and into the high pressure pump inlet port (64) where it is then forced out through the high pressure pump outlet port (68) and into the pressure regulator assembly (14) through the hose (78). Most of the fuel is forced through the final filter (76) and out into the fuel supply rail where it exits the fuel injectors in the fuel and air inlet valves of the engine cylinders. When the pressure inside the pressure regulator assembly (14) exceeds the pressure outside due to a buildup of excess fuel, the pressure regulator assembly opens and the excess fuel drains back into the fuel reservoir (20). It should therefore be appreciated that the reservoir housing (20) is therefore always charged with fuel during vehicle operation. This fuel in the reservoir housing (20) is important to ensure that fuel is always available to the fuel pump (20) when the tank fuel in the main fuel tank (84) is forced away from the module (12) such as when the fuel level is low and the vehicle is cornering, accelerating, braking or operating on an incline as discussed previously. The fuel in the reservoir (20) is what the pump (24) will draw from during such times when the tank fuel is not available.

Figure 9:
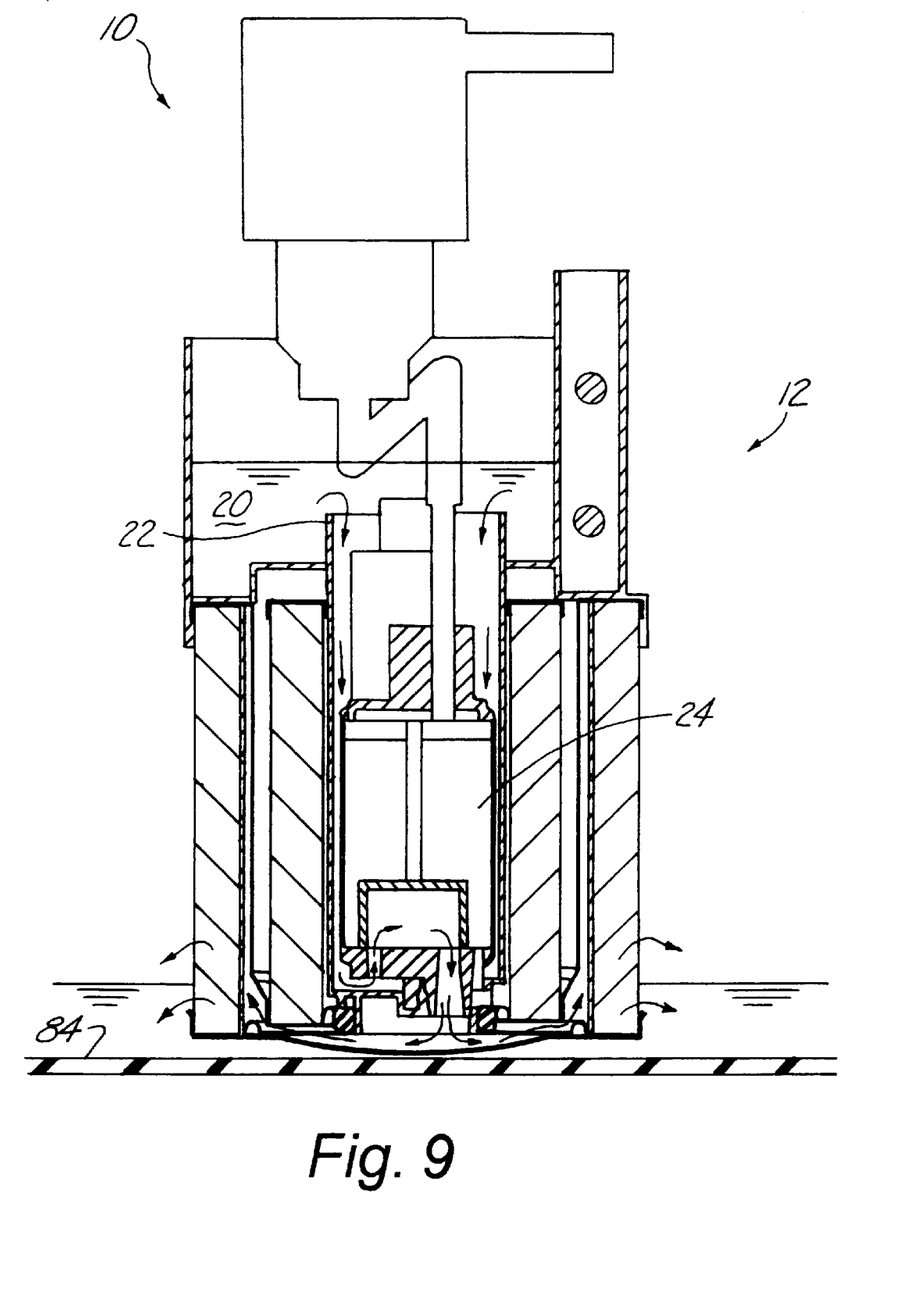

Referring now to FIG. 9, when the vehicle is shut off, the turbine (52) ceases to spin, thus there is no longer a low pressure area within the module (12) acting to draw in the fuel. As such, the fuel in the reservoir (20) will begin to drain out in the opposite direction from which it entered. The fuel drains into the top of the sleeve (22), down between the walls of the sleeve (22) and the pump (24), back out through the low pressure pump outlet (66), through the inner impellers of the turbine (52), out through the low pressure pump inlet (62) into the area between the end cap (32) and the bottom of the casing (30) and back out through the primary filter (26) and into the tank, until equilibrium is achieved. It should be appreciated, however, as shown in FIG. 10, that not all of the fuel is allowed to drain from the reservoir (20) of the module (12), which is one of the primary objectives of the present invention.

Figure 10:
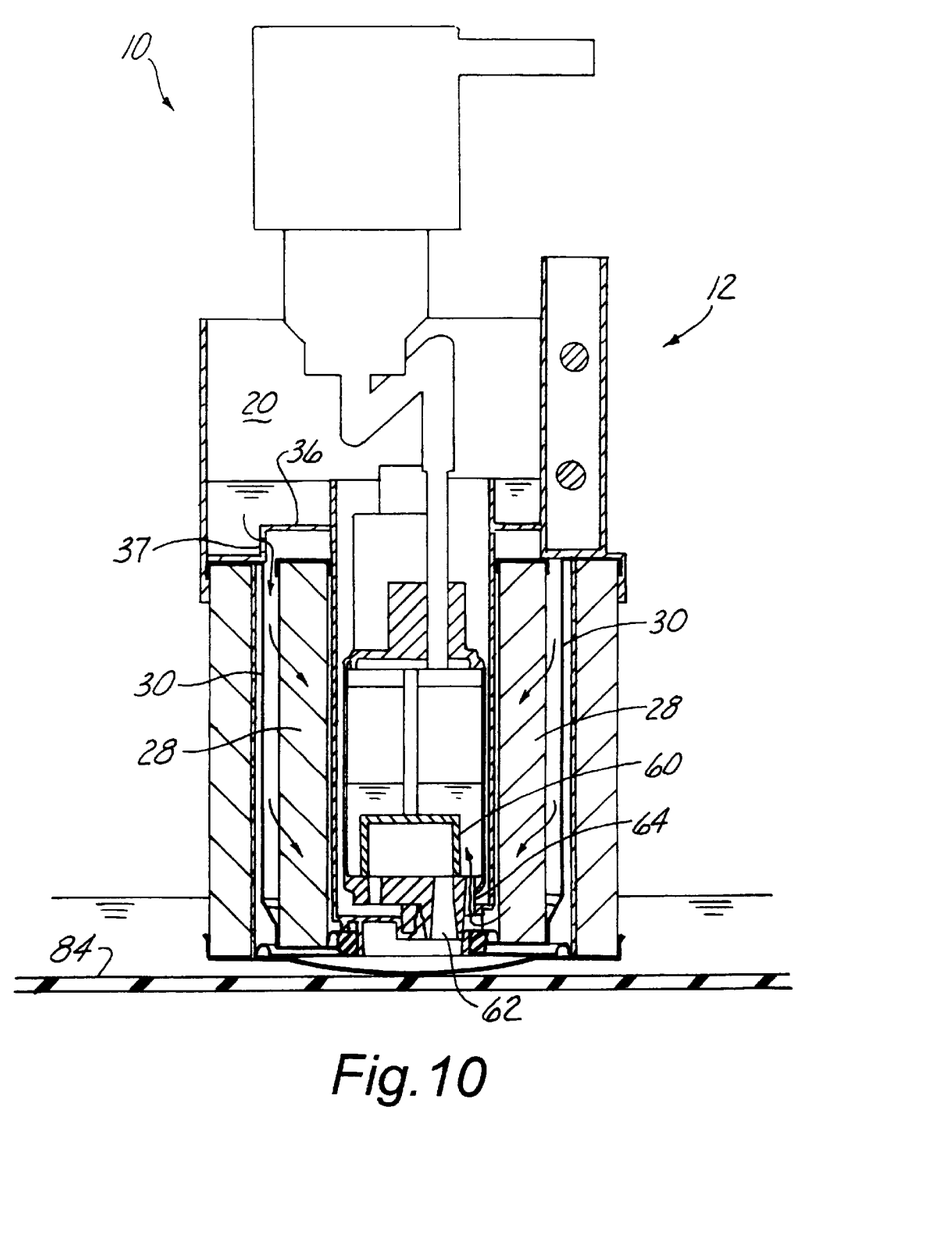

Referring to FIG. 10, a portion of the fuel is retained in the fuel reservoir (20) even after the vehicle engine is turned off. This portion of fuel in the reservoir (20) is retained without the use of check valves or float valves, which is another of the primary objectives of the present invention. It should be understood that the fuel remaining in the reservoir (20) below the top of the sleeve (22) can only exit the reservoir (20) through the passages (37) in the annular bottom plate (36) of the reservoir housing (20). The fuel passing through theses passages (37) is subsequently contained within the area between the casing (30) and the secondary filter (28). Because the turbine (52) of the pump (24) is no longer spinning to create a low pressure to draw the fuel through the secondary filter (28), the fuel will only be drawn through the secondary filter (28) by the force of gravity. Any fuel making its way through the secondary filter (28) can only go so far as the high pressure inlet port (64) of the pump (24) due to the presence of the annular ring (60) separating the high pressure inlet port (64) and the low pressure inlet port (62) thereby blocking the only exit for the fuel to escape back into the fuel tank as shown in FIG. 9. Additionally, fuel will only pass through the high pressure pump inlet port (64) and into the pump (24) until equilibrium is reached. Thus, fuel will always be available to the fuel pump (24) on engine startup. As mentioned before, no check or float valves are needed since the tight tolerance between the annular ring (60) and the pump housing (50) prevents the fuel from escaping between the high pressure pump inlet (64) and the low pressure pump inlet (62) when the vehicle engine is not running.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A passive fuel delivery module adapted for installation in fuel tanks of vehicles, comprising:
   a top cover adapted to be secured to the top of a fuel tank of a vehicle;
   a reservoir housing operably supported by and disposed below said top cover for receiving and holding a fuel reserve;
   an elongated sleeve having a first end and a second end, said first end extending a distance into said reservoir housing, said second end extending a distance below said reservoir housing;
   a pump disposed within said sleeve, said pump having a high pressure inlet, a low pressure inlet, a high pressure outlet and a low pressure outlet;
   a secondary filter disposed concentrically around said sleeve;
   a primary filter disposed concentrically around said secondary filter;
   a casing disposed concentrically between said primary and secondary filters and wherein said casing supports said primary and secondary filters below said reservoir housing; and
   a primary filter end cap adapted to removably attach to said casing such that said casing and end cap substantially fluidly seal said secondary filter from said primary filter.

2. The passive fuel delivery module as recited in claim 1 wherein said pump is a turbine pump having inner and outer series of impeller blades separated by an annular ring.

3. The passive fuel delivery module as recited in claim 2 wherein said low pressure pump inlet is disposed below said inner impeller blades, said high pressure pump inlet disposed below said outer impeller blades, and said annular ring is disposed between said low pressure and high pressure pump inlets thereby substantially fluidly sealing said low pressure pump inlet from said high pressure pump inlet.

4. The passive fuel delivery module as recited in claim 3 wherein said passive fuel delivery module is biased downward such that said primary filter end cap is in surface contact with said fuel tank bottom.

5. The passive fuel delivery module as recited in claim 4 further comprising a fuel pressure regulator assembly in fluid communication with said high pressure pump outlet.

6. The passive fuel delivery module as recited in claim 5 wherein a hose connects said high pressure pump outlet to said fuel pressure regulator assembly.

7. The passive fuel delivery module as recited in claim 6 wherein said hose is configured to bias said fuel delivery module downward.

8. The passive fuel delivery module as recited in claim 5 wherein said fuel pressure regulator assembly is operably supported below said top cover.

9. The passive fuel delivery module as recited in claim 8 further comprising a solid state electronic fuel level sensor.

10. The passive fuel delivery module as recited in claim 1 further comprising:
    a suspension assembly, said suspension assembly comprising a pair of U-shaped linkages, one leg of each of said U-shaped linkages operably and pivotally connected to said top cover, another leg of each of said U-shaped linkages operably and pivotally connected to said reservoir housing, whereby said fuel delivery module is operably suspended below said top cover and whereby the pivoting linkage connection enables said fuel delivery module to displace vertically with the fuel tank bottom.

11. A suspension mechanism for passive fuel delivery modules adapted to be secured to a stationary hanger in a fuel tank of a vehicle, comprising:
    a biasing member operably connected to said passive fuel delivery module which acts to bias said module downward such that the bottom of the module is in contact with the bottom of the fuel tank;
    a pair of U-shaped pivoting links, one leg of each of said U-shaped links operably and pivotally connected to said stationary hanger, another leg of each of said U-shaped links operably and pivotally connected to said fuel delivery module, whereby said fuel delivery module is operably suspended below said stationary hanger and whereby the pivoting linkage connection enables said fuel delivery module to displace vertically with the fuel tank bottom.

* * * * *